United States Patent

[11] 3,552,548

[72] Inventors Victor C. Wallestad
Edina;
Joel A. Elftmann, Bloomington, Minn.

[21] Appl. No. 750,104
[22] Filed Aug. 5, 1968
[45] Patented Jan. 5, 1971
[73] Assignee Fluoroware, Inc.
Chaska, Minn.
a corporation of Minnesota

[54] WAFER STORAGE AND SHIPPING CONTAINER
2 Claims, 5 Drawing Figs.

[52] U.S. Cl. .......... 206/1, 215/6, 215/37, 215/38: 220/4, 220/42, 220/93: 206/65
[51] Int. Cl. .......... B65d 21/02, B65d 81/08
[50] Field of Search .......... 206/1, 65F, 18, 5A; 220/42A, 4(cursory); 215/10

[56] References Cited

UNITED STATES PATENTS

| | | | |
|---|---|---|---|
| 856,463 | 6/1907 | Goss et al. | 206/18 |
| 2,544,095 | 3/1951 | Kower | 220/42(A) |
| 2,645,375 | 7/1953 | Topfer | 220/4 |
| 2,765,950 | 10/1956 | Wheeler | 220/42(A)X |
| 2,940,589 | 6/1960 | Silverman | 206/5(A) |
| 3,467,242 | 9/1969 | DeRousse | 206/1 |

OTHER REFERENCES

IBM Technical Disclosure Bulletin-Wafer Package, Vol. 8 No. 11 April 1966 Pg. 1642-Copy in 206-1

*Primary Examiner*—Donald F. Norton
*Attorney*—Merchant & Gould

ABSTRACT: A housing having a generally circular cross section with a wafer-receiving cavity therein and an opening having an inner dimension larger than the peripheral dimension of the wafer, an inner surface of said cavity which tapers inwardly from the outer edges thereof generally toward the center and away from the opening so that only the outermost edges of the wafer touch the sides of the cavity, a spring having a generally semispherical shape positioned above the wafer to engage only the edges thereof and a cover or a similar housing affixed over the opening of the cavity in sealing engagement in abutting relationship with the central portion of the spring to hold the wafer relatively immovable.

PATENTED JAN 5 1971

3,552,548

INVENTORS
VICTOR C. WALLESTAD
JOEL A. ELFTMANN
BY
Merchant & Gould
ATTORNEYS

WAFER STORAGE AND SHIPPING CONTAINER

BACKGROUND OF THE INVENTION

1. Field of the Invention

In the production of integrated circuits and the like it is common practice for a company to make the wafers, which are formed from silicone, germanium, or the like, and ship them to another company which then produces the integrated circuits. During shipping and handling of the wafers it is extremely important that at least one flat surface thereof remains completely smooth and virtually untouched. Any slight rubbing of foreign material on the surface of the wafer may produce microgrooves therein which render that portion of the wafer unusable. Further, the wafers must be maintained relatively clean and free of deposits of foreign material, such as dust and the like, thereon.

In addition to wafers for integrated circuits it is generally desirable to utilize individual containers for a great many other devices. In discussing the present invention, the preferred embodiment is a container for wafers but it should be understood that many other uses for the present invention will be apparent.

2. Description of the Prior Art

In the prior art many types of individual containers are described some of which are extremely complicated and expensive and the others of which are unreliable for storing devices as delicate as wafers for integrated circuits. All of the prior art containers are difficult and inconvenient to handle.

SUMMARY OF THE INVENTION

The present invention pertains to a storage and shipping container having a cavity therein with a surface which tapers inwardly from adjacent the edges thereof and away from the opening of the cavity and cover means engaged with said housing to close the opening. The invention further includes a plurality of mating ramp-shaped projections between radially overlying portions of the cover and the housing to frictionally engage the cover on the housing with slight rotary movement therebetween.

It is an object of the present invention to provide a new and improved storage and shipping container.

It is a further object of the present invention to provide a housing having improved means for engaging a cover or a similar container thereon.

It is a further object of the present invention to provide improved containers which are extremely convenient to store, ship, and handle.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the FIGS.

DESCRIPTION OF THE PREFERRED EMBODIMENT

Figures 1, 2, 3, 4, 5:
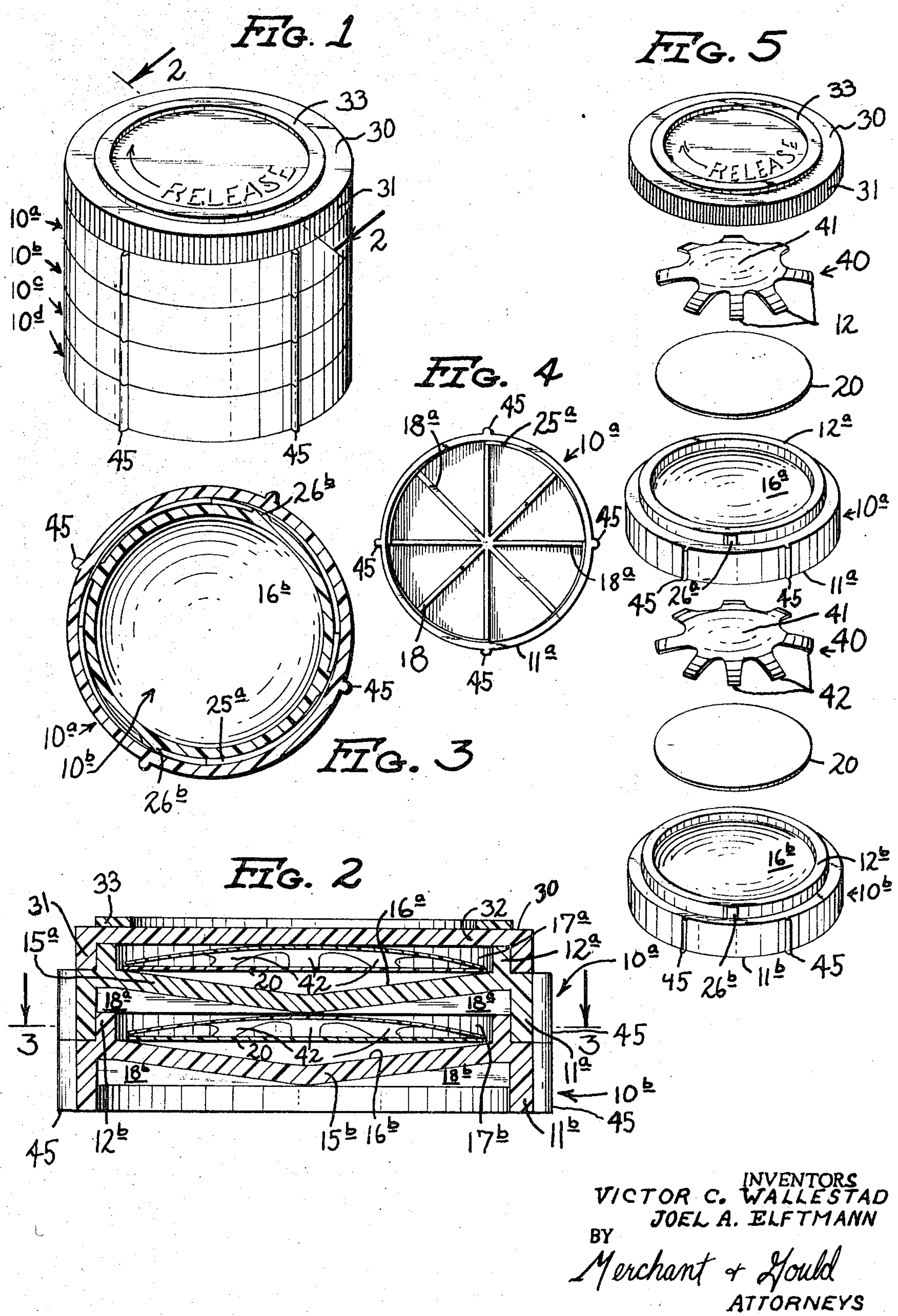
FIG. 1 is a view in perspective of a plurality of container housings engaged together with a cover engaged on the end housing.
FIG. 2 is an enlarged sectional view as seen from the line 2–2 in FIG. 1.
FIG. 3 is a sectional view, somewhat diminished in size, as seen from the line 3–3 in FIG. 2.
FIG. 4 is a view in bottom plan, somewhat diminished in size, of the containers illustrated in FIG. 1.
FIG. 5 is an exploded view in perspective, somewhat diminished in size, of the containers illustrated in FIG. 1.

A plurality of housings, generally designated **10*a*, 10*b*, 10*c* and 10*d***, are illustrated in the FIGS. Each of the housings are substantially similar and, therefore, similar parts are designated with similar numerals having different letters affixed thereto to indicate different housings. Because all of the housings are substantially similar only one housing will be explained in detail.

The housing **10*a* has a first generally tubular portion 11*a* with a second generally tubular portion 12*a* coaxially affixed to one end thereof. Both the first and second tubular portions 11*a* and 12*a* have generally circular cross sections in this embodiment and the inner diameter of the first tubular portion 11*a* is somewhat larger than the outer diameter of the second tubular portion 12*a*. The housings 10*a* through 10*d* are constructed so that the first tubular portions 11*a* through 11*d* can be placed in radial overlying relationship with the second tubular portions 12*a* through 12*d* of an adjacent housing 10*a* through 10*d***.

The housing **10*a* has a partition 15*a* extending generally transversely across the tubular portion 11*a*. In the present embodiment the first tubular portion 11*a*, the second tubular portion 12*a* and the partition 15*a* are all formed as an integral unit with the partition 15*a* joining the sides at approximately the junction of the first tubular portion 11*a* and the second tubular portion 12*a*. The partition 15*a* has an inner surface 16*a* which, in conjunction with the second tubular portion 12*a*, defines a cavity 17*a* in the housing 10*a*. The inner surface 16*a* tapers inwardly from the second tubular portion 12*a* toward the center of the inner surface 16*a* and away from the open end of the cavity 17*a* formed by the outermost end of the second tubular portion 12*a*. Thus, the depth of the cavity 17*a* increases gradually from the outer edges thereof toward the center. In the present embodiment the inner surface 16*a* tapers along a generally straight line but it should be understood that other amounts of taper or geometrical shapes of the inner surface 16*a*** might be utilized if they provide the functions of this apparatus.

In this embodiment the thickness of the partition **15*a* is uniform so that the surface opposite the inner surface 16*a* tapers in a similar fashion. A plurality of radially extending fillets 18*a* are provided between the surface of the partition 15*a* opposite the inner surface 16*a* and the first tubular portion 11*a* to prevent relative movement of the partition 15*a*. The first tubular portion 11*a* extends longitudinally past the exposed surfaces of the fillets 18*a* a sufficient distance to allow the tubular portion 12*b* of a housing 10*b* to be positioned therein. The extended end of the tubular portion 11*a* and the junction of the tubular portions 11*b* and 12*b* of the housing 10*b* are constructed so that the tubular portions 11*a* and 11*b* mate in generally end-to-end abutting engagement while the tubular portion 11*a* is in radially overlying relationship to the tubular portion 12*b*. In a similar fashion additional housings 10*c* can be fitted onto housing 10*b* and 10*d* onto 10*c***, etc.

The first tubular portion **11*a* has a plurality of ramp-shaped portions 25*a* extending radially inwardly from the inner periphery thereof. The ramp-shaped portions 25*a* are directed so that the inner diametric dimension of the first tubular portion 11*a* gradually decreases from adjacent the end of one ramp-shaped portion 25*a* to adjacent the end of the succeeding ramp-shaped portion 25*a* moving in a clockwise direction, in FIG. 3. In FIG. 3 four ramp-shaped portions 25*a* are illustrated but is should be understood that more or less might be utilized if desired. The second tubular portion 12 *b* of the housing 10*b*, which is fitted within the first tubular portion 11*a* of the housing 10*a* in FIG. 2, has a plurality of ramp-shaped portions 26*b* extending radially outwardly from the outer periphery thereof. The ramp-shaped portions 26*b* have a somewhat sharper incline so that the housings 10*a* and 10*b* can be easily fitted together, and the inclines of the ramp-shaped portions 26*b* are directed oppositely to the inclines of the ramp-shaped portions 25*a*. Thus, rotary movement of the housing 10*a* with respect to the housing 10*b* in a counterclockwise direction as viewed in FIG. 1 causes the ramp-shaped portions 25*a* to frictionally engage the ramp-shaped portions 26*b* and securely engage the housings 10*a* and 10*b* together. In this position the housing 10*a* closes the cavity 17*b* in the housing 10*b* and operates as cover means to substantially prevent dirt from entering the cavity 17***b* and a wafer 20 or the like from egressing therefrom. Since each of the housings 10*a*, 10*b*, 10*c*, 10*d*, etc., have ramp-shaped portions 25*a*, 26*a*, etc., positioned thereon, all of the housings 10*a*, 10*b*, etc., can be tightly engaged together in a cylindrically shaped stack.

In addition to being able to use one of the other housing 10*a* through 10*d* for a cover means, a cover 30 is provided. A cover 30 may be utilized on each of the housings 10*a* through 10*d* or a single cover 30 may be utilized on the top of a stack of housings 10*a* through 10*d*, as illustrated in FIG. 1. The cover 30 is provided with a longitudinally extending tubular portion 31 having diametric dimensions similar to the tubular portion 11*a* of the housing 10*a* and extending longitudinally a sufficient distance to receive the tubular portion 12*a* therein. A plurality of ramp-shaped portions (not shown) extend radially inwardly from the tubular portion 31 similar to the ramp-shaped portions 25*a*. The cover 30 has a partition 32 extending thereacross which closes the cavity 17*a* when the cover 30 is engaged with the housing 10*a*. The partition 32 has a portion 33 extending longitudinally outwardly therefrom in a direction opposite to the tubular portion 31 and having a diameter slightly smaller than the diameter of the tubular portion 11*a* of the housing 10*a*. The upwardly extending portion 33 of the cover 30 allows individually covered housings to be piled in relatively stable stacks without engaging the housings together.

Typical wafers 20 are illustrated in FIGS. 2 and 5. Referring to FIG. 2 it can be seen that the inner surface 16*a* of the partition 15*a* is formed so that only the extreme edges of the wafer 20 are in contact therewith. Also, it can be seen that the inner diameter of the second tubular portion 12*a* and, consequently, the diametric dimensions of the cavity 17*a* and the opening therein, are somewhat larger than the peripheral dimensions of the wafer 20 so that the wafer 20 can be easily placed therein without damage thereto.

Spring means generally designated 40 includes a central portion 41 having a plurality of legs 42 radiating outwardly therefrom. The central portion 41 and the legs 42 are formed generally in the shape of a portion of a sphere so that a cross section through two of the legs 42 and the central portion 41 is generally arcuate in shape. The shape and diameter of the spring means 40 are such that it can be placed in the cavity 17*a* and will engage the wafer 20 only along portions of the edge of the wafer 20. Further, when the spring means 40 is properly positioned in the cavity 17*a* at least part of the central portion 41 extends beyond the end of the tubular portion 12*a*. Thus, when cover means (either another housing or a cover 30) are placed in engagement with the housing 10*a* the spring means 40 is distorted slightly downwardly. This distortion of the spring means 40 produces a bias on the edges of the wafer 20 positioned in the cavity 17*a* to hold the wafer 20 substantially immovable. In this embodiment the spring means 40 is formed of a resilient plastic to minimize damage to the wafer 20 at contact points, to simplify production thereof and to reduce costs. It should be understood, however, that many other spring means might be utilized if they perform the functions of the described spring means 40.

Each of the housings 10*a* through 10*d* are provided with a plurality of radially outwardly extending ears 45. In the present embodiment the ears 45 are affixed to the housings 10*a* through 10*d* so that they are aligned axially when the housing 10*a* through 10*d* are engaged together. In shipping a stack of housings, such as housings 10*a* through 10*d* illustrated in FIG. 1, it is placed in a fiberboard tube having an inner diameter approximately equal to the diameter of the housings and the ears 45. Thus, the ears 45 serve to space the outer periphery of the housings 10*a* through 10*d* from the inner walls of the shipping tubes so that the housings 10*a* through 10*d* are cushioned somewhat against jarring and the like.

Thus, a storage and shipping container is disclosed which is extremely convenient to use and inexpensive to manufacture. The container can be utilized to store delicate individual devices such as wafers so that only the extreme edges of the wafers are in engagement with the container. Further, the containers can be engaged in stacks for shipping or utilized separately with a cover. In either instance the covers and housings are quickly and easily engageable and disengageable.

We claim:

1. A wafer storage and shipping container comprising:
   a. a housing having a wafer receiving cavity therein with an opening having inner dimensions larger than the peripheral dimensions of a wafer to be positioned therein;
   b. said housing having an inner surface at least partially defining the cavity, which surface tapers inwardly from adjacent the opening toward substantially the center of said surface and away from the opening, for engaging a wafer only adjacent at least portions of the edges of said wafer;
   c. cover means engaged with said housing over the opening of the cavity to substantially close the opening; and
   d. spring means having a central portion with a plurality of legs radiating outwardly therefrom and having a generally arcuate cross section so that the central portion of said spring means bears against said cover means and said legs bear against the inner surface of said housing adjacent the ends of said legs with the spring means properly positioned in the container, said spring means being constructed of a size, relative to a wafer positioned in said container, for engaging the wafer only adjacent the edges of said wafer.

2. A wafer storage and shipping container as set forth in claim 1 wherein the spring means is constructed from a relatively resilient plastic.